United States Patent
Cao

(10) Patent No.: US 8,484,304 B2
(45) Date of Patent: Jul. 9, 2013

(54) METHOD AND APPARATUS FOR OBTAINING SIZE OF EMAILS OF TERMINAL

(75) Inventor: Gang Cao, Guangdong Province (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 13/257,668

(22) PCT Filed: Apr. 23, 2010

(86) PCT No.: PCT/CN2010/072133
§ 371 (c)(1),
(2), (4) Date: May 3, 2012

(87) PCT Pub. No.: WO2011/091628
PCT Pub. Date: Aug. 4, 2011

(65) Prior Publication Data
US 2012/0324021 A1    Dec. 20, 2012

(30) Foreign Application Priority Data
Jan. 29, 2010 (CN) .......................... 2010 1 0107575

(51) Int. Cl.
*G06F 15/16* (2006.01)
(52) U.S. Cl.
USPC ........................... 709/206; 709/203; 709/104
(58) Field of Classification Search
USPC .......................... 709/206, 203, 104
See application file for complete search history.

(56) References Cited

U.S. PATENT DOCUMENTS 1,980,407 A * 11/1934 Housh ........................ 451/556
2010/0011076 A1 * 1/2010 Shkolnikov et al. .......... 709/206

FOREIGN PATENT DOCUMENTS

| CN | 1980407 A | 6/2007 |
| CN | 101515905 A | 8/2009 |
| CN | 101527692 A | 9/2009 |
| CN | 101635898 A | 1/2010 |
| JP | 2009177432 A | 8/2009 |

OTHER PUBLICATIONS

International Search Report for PCT/CN2010/072133 dated Oct. 12, 2010.

* cited by examiner

*Primary Examiner* — Tammy Nguyen
(74) *Attorney, Agent, or Firm* — Ling Wu; Stephe Yang; Ling and Yang Intellectual Property

(57) ABSTRACT

A method for obtaining a size of an Email of a terminal includes: the terminal extracting a preset standard mail template from a terminal file system, and using the standard mail template as a standard size of the Email; obtaining a size of contents input when a user edits the Email, and obtaining a size of a mail header and a size of a mail body of the Email according to the size of the contents input and the standard mail template; and adding the size of the mail header to the size of the mail body to obtain and display the size of the Email, so as to accurately obtain the size of the Email of the terminal. Accordingly, an apparatus for obtaining a size of an Email of a terminal is also provided by the invention.

16 Claims, 2 Drawing Sheets

METHOD AND APPARATUS FOR OBTAINING SIZE OF EMAILS OF TERMINAL

TECHNICAL FIELD

The present invention relates to the field of communications, and in particular, to a method and apparatus for obtaining a size of an Email of a terminal.

BACKGROUND OF THE RELATED ART

The Email, also referred to as an electronic mailbox or an electronic postal, is a communication mode for providing information exchange using electronic means, and has become a most popular service which is used on a plurality of networks around the world. The Email is a simple and rapid communication method, and implements processing such as transmission, reception and storage etc. of various types of signals by connecting Internets around the world, and transmits a mail to various corners around the world, and therefore, such a non-interactive communication has accelerated the information exchange and data transfer. While the Email is not limited to the transmission of text information, and can also transmit different types of information such as files, sounds, graphics, or images etc. in a form of an attachment.

With the rapid development of information technologies, most current mid-end and high-end mobile phones are integrated with Email client software, and the user can log in his/her own mailbox and view and transmit the Email at any time after a series of simple configurations are done on the mobile phones. Email applications primarily include several core modules such as editing of the mail, receiving and transmitting of the mail, storing and managing of the mail, viewing of the mail, account management etc. As referring to the limitation on a transmission size of the mail or limitation on a remaining storage space size of the mail on terminals such as mobile terminals etc., control on a size of the current Email in a mail editing module is very important.

However, it is found in the actual use that since the current edition size of the Email cannot be accurately obtained in the related art, there are technical defects of not being able to transmit or store the Email due to errors of the edition size and an encoding size of the Email. For example, if the limitation on a transmission size of the Email on the mobile terminal in the current network is 512K, and although a size of an Email displayed on a user edition interface is 502K, a fail transmission occurs when a user selects to transmit the Email, and the user is informed that the transmission limitation is exceeded, which indicates that the actual size after the Email is encoded exceeds 512K, and obviously, such a case will lead to a poor user experience.

SUMMARY OF THE INVENTION

The technical problem to be solved by the present invention is to provide a method and apparatus for obtaining a size of an Email of a terminal, which efficiently avoids technical defects that the Email can not be transmitted or stored due to errors of the edition size and an encoding size of the mail.

In order to solve the above technical problem, the present invention provides a method for obtaining a size of an Email of a terminal, comprising:

extracting a preset standard mail template from a terminal file system, and using the standard mail template as a standard size of the Email;

obtaining a size of contents input when a user edits the Email, and obtaining a size of a mail header and a size of a mail body of the Email according to the size of the contents input and the standard mail template; and adding the size of the mail header to the size of the mail body to obtain and display the size of the Email.

The step of obtaining a size of a mail header of the Email according to the size of the contents input and the standard mail template comprises:

obtaining a size of input contents of each field of the mail header when the user edits the mail header of the Email;

subtracting the size of the input contents of each field from a standard size of a corresponding field of the mail header in the standard mail template to obtain a field difference of each field; and adding the field difference of each field to the standard size of the mail header in the standard mail template, to obtain the size of the mail header of the currently edited Email.

The step of obtaining a size of a mail body of the Email according to the size of the contents input and the standard mail template comprises:

obtaining a size of text contents input by the user and/or a size of an attachment inserted by the user when the user edits the mail body of the Email;

extracting a standard size of the mail body in the standard mail template; and adding the standard size of the mail body to the size of the text contents and/or the size of the attachment, to obtain the size of the mail body of the Email edited by the user.

the standard mail template is an encoding parameter table of an empty mail, and the encoding parameter table comprises a standard size of a mail body, a standard size of a mail header and a standard size of each field in the mail header corresponding to the empty mail after being encoded.

The empty mail is an Email of which the text and the attachment are both empty. The standard size of the mail body is a size of a mail body obtained after encoding an empty mail body; the standard size of the mail header is a size of a mail header obtained after encoding an empty mail header; and the standard size of each field in the mail header is a size of a mail header obtained after encoding an empty field.

In order to solve the above technical problem, the present invention further provides an apparatus for obtaining a size of an Email of a terminal, comprising:

a parameter module, configured to extract a preset standard mail template from a terminal file system, and use the standard mail template as a standard size of the Email;

a processing module connected with the parameter module, configured to obtain a size of contents input when a user edits the Email, and obtain a size of a mail header and a size of a mail body of the Email according to the size of the contents input and the standard mail template; and a mail module connected with the processing module, configured to add the size of the mail header to the size of the mail body, to obtain and display the size of the Email.

The processing module comprises:

a first obtaining unit connected with the parameter module, configured to obtain a size of input contents of each field of the mail header when the user edits the mail header of the Email;

a processing unit connected with the first obtaining unit, configured to subtract the size of the input contents of each field from a standard size of a corresponding field of the mail header in the standard mail template to obtain a field difference of each field; and a mail header unit connected with the processing unit and the mail module respectively, configured to add the field difference of each field to the standard size of the mail header in the standard mail template, to obtain a size of a mail header of the currently edited Email and transmit to the mail module.

The processing module comprises:

a second obtaining unit connected with the parameter module, configured to obtain a size of text contents input by the user and/or a size of an attachment inserted by the user when the user edits the mail body of the Email;

an extracting unit connected with the parameter module, configured to extract a standard size of the mail body in the standard mail template; and a mail body unit connected with the second obtaining unit, the extracting unit and the mail module respectively, configured to add the standard size of the mail body to the size of the text contents and/or the size of the attachment, to obtain the size of the mail body of the currently edited Email, and transmit it to the mail module.

The standard mail template is an encoding parameter table of an empty mail, and the encoding parameter table comprises a standard size of a mail body, a standard size of a mail header and a standard size of each field in a mail header corresponding to the empty mail after being encoded.

The empty mail is an Email of which the text and the attachment are both empty.

The standard size of the mail body is a size of a mail body obtained after encoding an empty mail body; the standard size of the mail header is a size of a mail header obtained after encoding an empty mail header; and the standard size of each field in the mail header is a size of a mail header obtained after encoding an empty field.

The present invention provides a method and apparatus for obtaining a size of an Email of a terminal such as a mobile terminal etc., which can accurately obtain the size of the Email edited by the terminal and control errors of an edition size of the Email displayed on the mobile terminal and an encoding size thereof within an insignificant range by introducing a standard mail template as a standard size of the Email and using the standard mail template as a size criterion of the currently edited Email, thus effectively avoiding conditions when the Email can not be transmitted and stored due to the errors, greatly enhancing the overall performance of the Email application of the mobile terminal and improving the user experience of the Email application of the mobile terminal.

PREFERRED EMBODIMENTS OF THE PRESENT INVENTION

The technical scheme of the present invention will be further described in detail in conjunction with accompanying drawings hereinafter.

Figure 1:
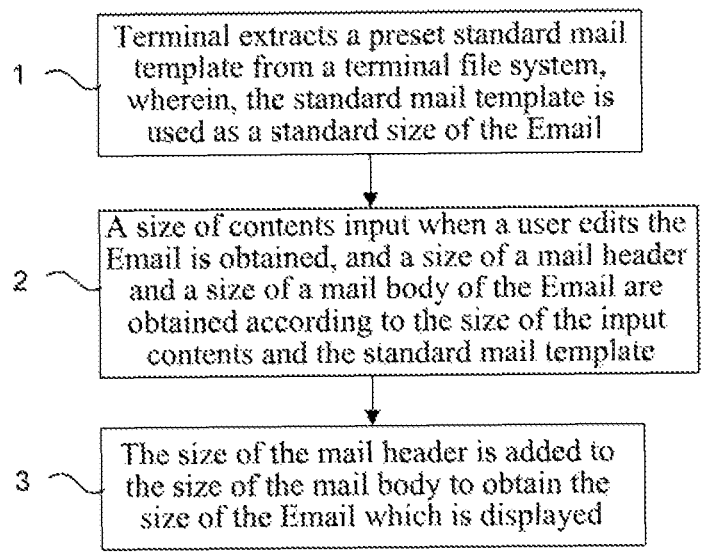
FIG. 1 is a flowchart of a method for accurately obtaining a size of an Email of a terminal according to an embodiment of the present invention.

FIG. 1 is a flowchart of a method for accurately obtaining a size of an Email of a terminal according to an embodiment of the present invention, which comprises the following steps.

In Step one, a terminal extracts a preset standard mail template from a terminal file system, wherein, the standard mail template is used as a standard size of the Email.

In Step two, a size of contents input when a user edits the Email is obtained, and a size of a mail header and a size of a mail body of the Email are obtained according to the size of the contents input and the standard mail template.

In Step three, the size of the mail header is added to the size of the mail body to obtain the size of the Email which is displayed, so as to accurately obtain the size of the Email of the terminal.

The embodiment of the present invention provides a method and apparatus for obtaining a size of an Email of a terminal, which can control errors of an edition size of the Email displayed on the mobile terminal and an encoding size thereof within an insignificant range by introducing a standard mail template as a standard size of the Email and using the standard mail template as a size criterion of the currently edited Email, thus effectively avoiding conditions when the Email can not be transmitted and stored due to the errors or conditions when re-editing of the Email is required to transmit and store the Email, which greatly enhances the overall performance of the Email application of the mobile terminal and improves the user experience of the Email application of a terminal such as a mobile terminal etc. The present embodiment will be illustrated by example of a mobile terminal.

After being analyzed and studied by the present inventor, the reason why the existing technologies cannot accurately obtain the current edition size of the Email is that the existing method only considers the size of the text contents of the Email and the size of the inserted attachment in the edition process, without considering the size of the mail header after being encoded, or even though the size of the mail header is considered, only a fixed size value (for example, 2K bytes) is reserved as a size of the mail header. In the actual application, since there is a significant difference between the mail headers of the Email, and in addition there is a change of the mail body after being encoded, the actual encoding size of the whole Email is greatly different from the edition size displayed by the Email, and in a case of being close to a border condition, such difference always influences the transmission and storage of the mail.

In the technical scheme of the embodiment of the present invention, the present invention introduces a standard mail template as a standard size of the Email, the standard mail template is an encoding parameter table of an empty mail, and the encoding parameter table reflects a size of an empty mail after being encoded, wherein, the empty mail is an Email with the text and the attachment being empty. When the Email is edited, the edition size of the Email is comprised of a size of the mail header and a size of the mail body of the Email. The standard mail template of the present invention is a standard size of a mail body, a standard size of a mail header, and a standard size of each field in a mail header corresponding to the empty mail after being encoded. Specifically, the standard size of the mail body is a size of the mail body obtained after encoding an empty mail body (without a text and an attachment), the standard size of the mail header is a size of a mail header obtained after encoding an empty mail header (without input contents), and the standard size of each field in the mail header is a size of a mail header obtained by encoding an empty field (without input contents). The standard mail template is preset (stored) in the terminal file system of the mobile phone, and when receiving an instruction to newly create or edit the Email, the mobile terminal loads the standard mail template from the terminal file system into a memory. Table one is an example structural table of the standard mail template according to the embodiment of the present invention, wherein, the fields of the mail header not only have some fields of the mail header which must be supported when encoding the Email, for example, recipient, transmission date, mail ID etc., but also have related fields selected by the user when performing the edition, such as TITLE, Carbon Copy (CC), Blind Carbon Copy (BCC), DATE etc. The standard mail template is a standard size for storing these field thresholds, and is in the unit of bytes. In the actual application, these encoding parameters can be obtained after encoding the actual empty mail on the mobile phone into a data file. For example, in Table one, A can be a certain value between 20-100 bytes, B can be a certain value between 20-1048 bytes, B1 can be a certain value between 20-80 bytes, B2 can be a certain value between 50-150 bytes, B3 can be a certain value between 20-80 bytes, B4 can be a certain value between 20-80 bytes, and B5 can be a certain value between 50-150 bytes, and so on.

TABLE ONE example structural table of the standard mail template according to an embodiment of the present invention

| Various parameters in the standard mail template | Standard size after being encoded (unit: byte) |
|---|---|
| Mail body | A |
| Mail header | B |
| TO field in the mail header | B1 |
| TITLE field in the mail header | B2 |
| BCC field in the mail header | B3 |
| CC field in the mail header | B4 |
| DATE field in the mail header | B5 |
| ... | ... |

Since the embodiment of the present invention presets a standard mail template in the terminal file system of the mobile phone, when the user edits the Email, the standard mail template is used as a size criterion of the Email, and the size of the mail header and the size of the mail body of the currently edited Email can be obtained according to the size of the input contents of the Email edited by the user.

Figure 2:
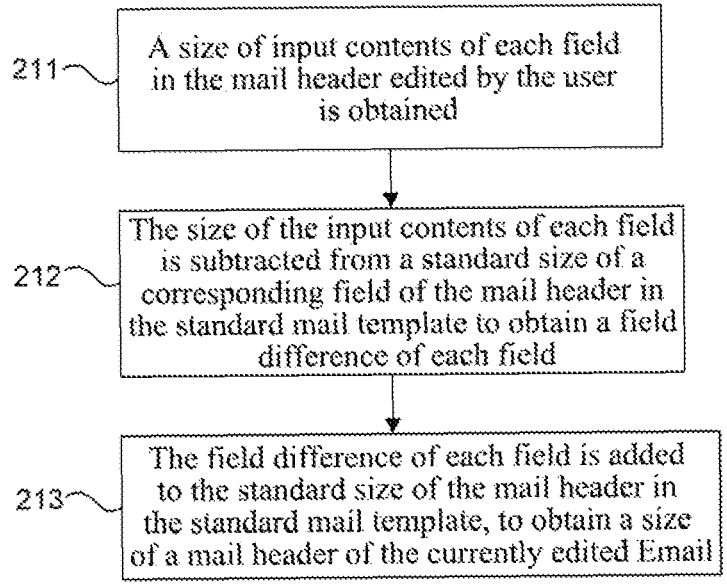
FIG. 2 is a flowchart of obtaining a size of a mail header of a currently edited Email according to an embodiment of the present invention.

FIG. 2 is a flowchart of obtaining a size of a mail header of a currently edited Email according to an embodiment of the present invention, which comprises the following steps.

In Step 211, a size of input contents of each field in the mail header edited by the user is obtained.

In Step 212, the size of the input contents of each field is subtracted from a standard size of a corresponding field of the mail header in the standard mail template to obtain a field difference of each field.

In Step 213, the field difference of each field is added to the standard size of the mail header in the standard mail template, to obtain a size of a mail header of the currently edited Email.

In the above technical scheme, the embodiment of the present invention uses the standard size of the mail header in the standard mail template as a size criterion of the mail header of the currently edited Email. When the user edits a certain field of the mail header, the mobile terminal compares the difference between the size of the field of the contents input (edited) by the user and the standard size of the field corresponding to the mail header in the standard mail template to obtain the field difference of the field, and obtains the size of the mail header of the currently edited Email only by adding the field difference to the standard size of the mail header. For a plurality of fields (such as TITLE, CC, BCC etc.), there will be a plurality of field differences to be obtained. Cumulative arithmetic superposition is performed on the field difference of each field and the standard size of the mail header, to finally obtain the size of the mail header of the currently edited Email. Although the size of the mail header obtained by the technical scheme of the present invention is an edition size of the Email header, since the standard size of the mail header and the standard size of each field in the mail header are actual sizes after being encoded, errors of the edition size and the encoding size of the mail header can be controlled within an insignificant range. It should be illustrated that each field of the mail header in the empty mail according to the present embodiment is in a form of "identifier+reserved empty bit", and therefore, when the user edits a certain field in the mail header, the size of the mail header can be obtained by accumulating the change of the size of the input contents relative to the standard size of the field on the standard size of the mail header, and size of the mail header is displayed in real time.

In the actual application, other technical means can also be used to obtain the size of the mail header of the currently edited Email. For example, each field of the mail header in the empty mail is in a form of "identifier", and therefore, when the user edits a certain field in the mail header, the size of the corresponding field can be obtained by accumulating the size of the input contents of the user on the standard size of the field, thus obtaining the size of the mail header. For another example, each field of the mail header in the empty mail can be in a form of "identifier", and only the standard size of the mail header is set in the standard mail template, and after the user edits all fields in the mail header, the size of the mail header of the currently edited Email can also be obtained by accumulating the size of all input contents of the user on the standard size of the mail header.

Figure 3:
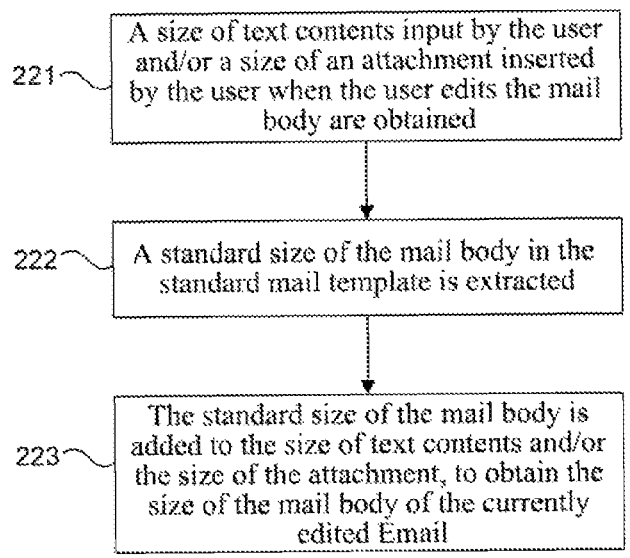
FIG. 3 is a flowchart of obtaining a size of a mail body of a currently edited Email according to an embodiment of the present invention.

FIG. 3 is a flowchart of obtaining a size of a mail body of a currently edited Email according to an embodiment of the present invention, which comprises the following steps.

In Step 221, a size of text contents input by the user and/or a size of an attachment inserted by the user when the user edits the mail body are obtained.

In Step 222, a standard size of the mail body in the standard mail template is extracted.

In Step 223, the standard size of the mail body is added to the size of text contents and/or the size of the attachment, to obtain the size of the mail body of the currently edited Email.

In the above technical scheme, the present invention uses the standard size of the mail body in the standard mail template as a size criterion of the mail body of the currently edited Email, and when the user inputs the text contents and/or inserts the attachment, the size of the mail body of the currently edited Email can be obtained only by directly accumulating the size of the text contents and/or the size of the attachment on the standard size of the mail body. Similarly, although the size of the mail body obtained by the technical scheme of the present invention is an edition size of the Email body, since the standard size of the mail body is an actual size after being encoded, errors of the edition size and the encoding size of the mail body can be controlled within an insignificant range. In the actual application, Step 222 can be implemented prior to Step 221, or both steps are performed synchronously.

Figure 4:
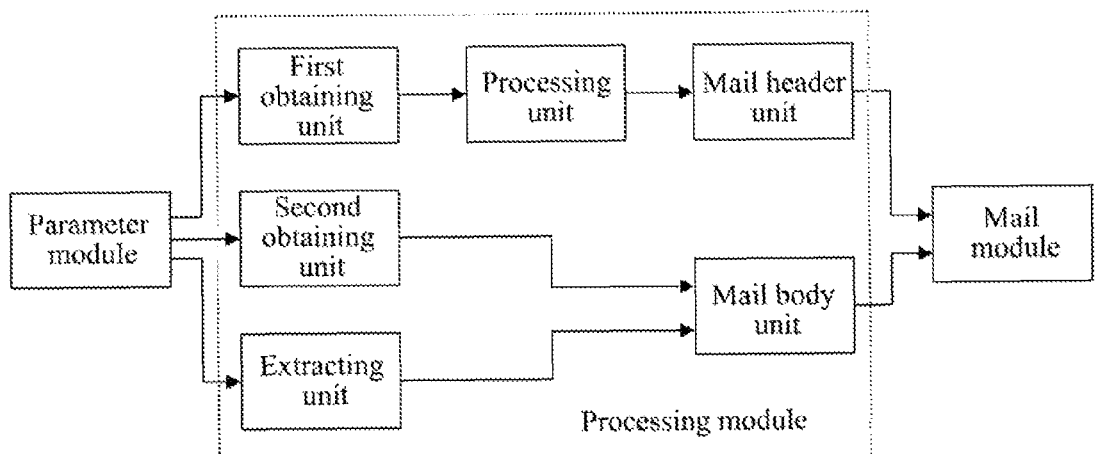
FIG. 4 is a structure diagram of an apparatus for accurately obtaining a size of an Email of a terminal according to an embodiment of the present invention.

FIG. 4 is a structural diagram of an apparatus for accurately obtaining a size of an Email of a terminal according to an embodiment of the present invention. The apparatus for accurately obtaining a size of an Email of a terminal according to the present invention comprises a parameter module, a processing module and a mail module, wherein, the parameter module is configured to extract a preset standard mail template from a terminal file system, and use the standard mail template as a standard size of the Email;

the processing module connected with the parameter module, is configured to obtain a size of contents input when a user edits the Email, and obtain a size of a mail header and a size of a mail body of the Email according to the size of the contents input and the standard mail template as the standard size of the Email; and the mail module connected with the processing module, is configured to add the size of the mail header to the size of the mail body, to obtain and display the size of the currently edited Email, so as to support accurately obtaining the size of the Email of the terminal.

The processing module according to the present invention comprises a first obtaining unit, a processing unit and a mail header unit, wherein, the first obtaining unit connected with the parameter module, is configured to obtain a size of input contents of each field when the user edits the mail header;

the processing unit connected with the first obtaining unit, is configured to subtract the size of the input contents of each field from a standard size of a corresponding field of the mail header in the standard mail template to obtain a field difference of each field; and the mail header unit connected with the processing unit and the mail module respectively, is configured to add the field difference of each field to the standard size of the mail header in the standard mail template to obtain a size of a mail header of the currently edited Email and transmit it to the mail module.

The processing module according to the present invention further comprises a second obtaining unit, an extracting unit and a mail body unit, wherein, the second obtaining unit connected with the parameter module, is configured to obtain a size of text contents input by the user and/or a size of an attachment inserted by the user when the user edits the mail body;

the extracting unit connected with the parameter module, is configured to extract a standard size of the mail body in the standard mail template; and the mail body unit connected with the second obtaining unit, the extracting unit and the mail module respectively, is configured to add the standard size of the mail body to the size of text contents and/or the size of the attachment, to obtain the size of the mail body of the currently edited Email, and transmit it to the mail module.

The standard mail template in the apparatus for accurately obtaining a size of an Email of a mobile terminal according to the present invention has been described in detail in the technical scheme of the method for accurately obtaining a size of an Email of a mobile terminal according to the present invention described above, and will no longer be described here.

The above description is only the preferred embodiments of the present invention and is not intended to limit the present invention. For those skilled in the art, the invention can have various modifications and variations. Any of modification, equivalent and improvement etc., which is made within the spirit and principle of the present invention, should be contained within the protection scope of the present invention.

Industrial Applicability

The present invention provides a method and apparatus for accurately obtaining a size of an Email of a terminal, which can accurately obtain the size of the Email edited by the terminal and control errors of an edition size of the Email displayed on the mobile terminal and an encoding size thereof within an insignificant range by introducing a standard mail template as a standard size of the Email and using the standard mail template as a size criterion of the currently edited Email, thus effectively avoiding conditions when the Email can not be transmitted or stored due to the errors, greatly enhancing the overall performance of the Email application of the mobile terminal and improving the user experience of the Email application of the mobile terminal.

What is claimed is:

1. A method for obtaining a size of an Email of a terminal, comprising:

extracting a preset standard mail template from a terminal file system, and using the standard mail template as a standard size of the Email;

obtaining a size of contents input when a user edits the Email, and obtaining a size of a mail header and a size of a mail body of the Email according to the size of the contents input and the standard mail template; and adding the size of the mail header to the size of the mail body to obtain and display the size of the Email;

wherein, the step of obtaining a size of a mail header of the Email according to the size of the contents input and the standard mail template comprises:

obtaining a size of input contents of each field of the mail header when the user edits the mail header of the Email;

subtracting the size of the input contents of each field from a standard size of a corresponding field of the mail header in the standard mail template to obtain a field difference of each field; and adding the field difference of each field to the standard size of the mail header in the standard mail template, to obtain the size of the mail header of the currently edited Email.

2. The method according to claim 1, wherein, the step of obtaining a size of a mail body of the Email according to the size of the contents input and the standard mail template comprises:

obtaining a size of text contents input by the user and/or a size of an attachment inserted by the user when the user edits the mail body of the Email;

extracting a standard size of the mail body in the standard mail template; and adding the standard size of the mail body to the size of the text contents and/or the size of the attachment, to obtain the size of the mail body of the Email edited by the user.

3. The method according to claim 1, wherein, the standard mail template is an encoding parameter table of an empty mail, and the encoding parameter table comprises a standard size of a mail body, a standard size of a mail header and a standard size of each field in the mail header corresponding to the empty mail after being encoded.

4. The method according to claim 3, wherein, the empty mail is an Email of which the text and the attachment are both empty.

5. The method according to claim 3, wherein, the standard size of the mail body is a size of a mail body obtained after encoding an empty mail body; the standard size of the mail header is a size of a mail header obtained after encoding an empty mail header; and the standard size of each field in the mail header is a size of a mail header obtained after encoding an empty field.

6. The method according to claim 1, wherein, the standard mail template is an encoding parameter table of an empty mail, and the encoding parameter table comprises a standard size of a mail body, a standard size of a mail header and a standard size of each field in the mail header corresponding to the empty mail after being encoded.

7. The method according to claim 6, wherein, the empty mail is an Email of which the text and the attachment are both empty.

8. The method according to claim 6, wherein,
the standard size of the mail body is a size of a mail body obtained after encoding an empty mail body; the standard size of the mail header is a size of a mail header obtained after encoding an empty mail header; and the standard size of each field in the mail header is a size of a mail header obtained after encoding an empty field.

9. An apparatus for obtaining a size of an Email of a terminal, comprising:
memories storing executable instruction;
processors executing the instructions being configured to operate as;
a parameter module, configured to extract a preset standard mail template from a terminal file system, and use the standard mail template as a standard size of the Email; a processing module connected with the parameter module, configured to obtain a size of contents input when a user edits the Email, and obtain a size of a mail header and a size of a mail body of the Email according to the size of the contents input and the standard mail template; and a mail module connected with the processing module, configured to add the size of the mail header to the size of the mail body, to obtain and display the size of the Email; wherein, the processing module comprises: a first obtaining unit connected with the parameter module, configured to obtain a size of input contents of each field of the mail header when the user edits the mail header of the Email;
a processing unit connected with the first obtaining unit, configured to subtract the size of the input contents of each field from a standard size of a corresponding field of the mail header in the standard mail template to obtain a field difference of each field; and a mail header unit connected with the processing unit and the mail module respectively, configured to add the field difference of each field to the standard size of the mail header in the standard mail template, to obtain a size of a mail header of the currently edited Email and transmit to the mail module.

10. The apparatus according to claim 9, wherein, the processing module comprises:

a second obtaining unit connected with the parameter module, configured to obtain a size of text contents input by the user and/or a size of an attachment inserted by the user when the user edits the mail body of the Email;
an extracting unit connected with the parameter module, configured to extract a standard size of the mail body in the standard mail template; and
a mail body unit connected with the second obtaining unit, the extracting unit and the mail module respectively, configured to add the standard size of the mail body to the size of the text contents and/or the size of the attachment, to obtain the size of the mail body of the currently edited Email, and transmit to the mail module.

11. The apparatus according to claim 9, wherein, the standard mail template is an encoding parameter table of an empty mail, and the encoding parameter table comprises a standard size of a mail body, a standard size of a mail header and a standard size of each field in a mail header corresponding to the empty mail after being encoded.

12. The apparatus according to claim 11, wherein, the empty mail is an Email of which the text and the attachment are both empty.

13. The apparatus according to claim 11, wherein, the standard size of the mail body is a size of a mail body obtained after encoding an empty mail body; the standard size of the mail header is a size of a mail header obtained after encoding an empty mail header; and the standard size of each field in the mail header is a size of a mail header obtained after encoding an empty field.

14. The apparatus according to claim 9, wherein, the standard mail template is an encoding parameter table of an empty mail, and the encoding parameter table comprises a standard size of a mail body, a standard size of a mail header and a standard size of each field in a mail header corresponding to the empty mail after being encoded.

15. The apparatus according to claim 14, wherein, the empty mail is an Email of which the text and the attachment are both empty.

16. The apparatus according to claim 14, wherein, the standard size of the mail body is a size of a mail body obtained after encoding an empty mail body; the standard size of the mail header is a size of a mail header obtained after encoding an empty mail header; and the standard size of each field in the mail header is a size of a mail header obtained after encoding an empty field.

* * * * *